US008958106B2

(12) United States Patent
Ishihara et al.

(10) Patent No.: US 8,958,106 B2
(45) Date of Patent: Feb. 17, 2015

(54) JAPANESE HYPHENATION PROCESSING PROGRAM, APPARATUS, METHOD, AND PRINTING SYSTEM

(71) Applicants: Rieko Ishihara, Tokyo (JP); Hongyang Guo, Tokyo (JP); Toshiki Yamanishi, Tokyo (JP); Hiroyuki Nishiyama, Tokyo (JP); Masahiko Yoshimura, Tokyo (JP); Yoshikazu Tanaka, Tokyo (JP); Seiji Tokuoka, Tokyo (JP)

(72) Inventors: Rieko Ishihara, Tokyo (JP); Hongyang Guo, Tokyo (JP); Toshiki Yamanishi, Tokyo (JP); Hiroyuki Nishiyama, Tokyo (JP); Masahiko Yoshimura, Tokyo (JP); Yoshikazu Tanaka, Tokyo (JP); Seiji Tokuoka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/202,509

(22) Filed: Mar. 10, 2014

(65) Prior Publication Data
US 2014/0268195 A1 Sep. 18, 2014

(30) Foreign Application Priority Data
Mar. 13, 2013 (JP) ................................. 2013-050890

(51) Int. Cl.
*G06F 3/12* (2006.01)
(52) U.S. Cl.
CPC .............. *G06F 3/126* (2013.01); *G06F 3/1205* (2013.01); *G06F 3/1255* (2013.01); *G06F 3/1285* (2013.01)
USPC ...................................................... 358/1.15

(58) Field of Classification Search
CPC ............................... G06F 3/126; G06F 3/1205
USPC ......................................................... 358/1.15
See application file for complete search history.

(56) References Cited

FOREIGN PATENT DOCUMENTS

JP 2000-225754 8/2000
JP 2006-301916 A * 11/2006

OTHER PUBLICATIONS

English Language Abstract of JP 2006-301916 A tp Kaname.*

* cited by examiner

*Primary Examiner* — Eric A Rust
(74) *Attorney, Agent, or Firm* — Harness, Dickey & Pierce, P.L.C.

(57) ABSTRACT

A non-transitory computer-readable storage medium which has stored thereon Japanese hyphenation processing programs is disclosed. The programs which, when executed by a computer, cause the computer to function as a first Japanese hyphenation information obtaining unit which obtains functional Japanese hyphenation information based on information on equipment capabilities obtained from an equipment unit and functional Japanese hyphenation setting information using the equipment capabilities; a second Japanese hyphenation information obtaining unit which obtains logical Japanese hyphenation information to be used by an application program from logical hyphenation setting information to be defined and used by the respective programs; a determining unit which determines a setting item to be inactive from setting items set for a print job based on the functional Japanese hyphenation information and the logical Japanese hyphenation information; and a transmitting unit which transmits information on the determined setting item to be inactive to the application program.

8 Claims, 6 Drawing Sheets

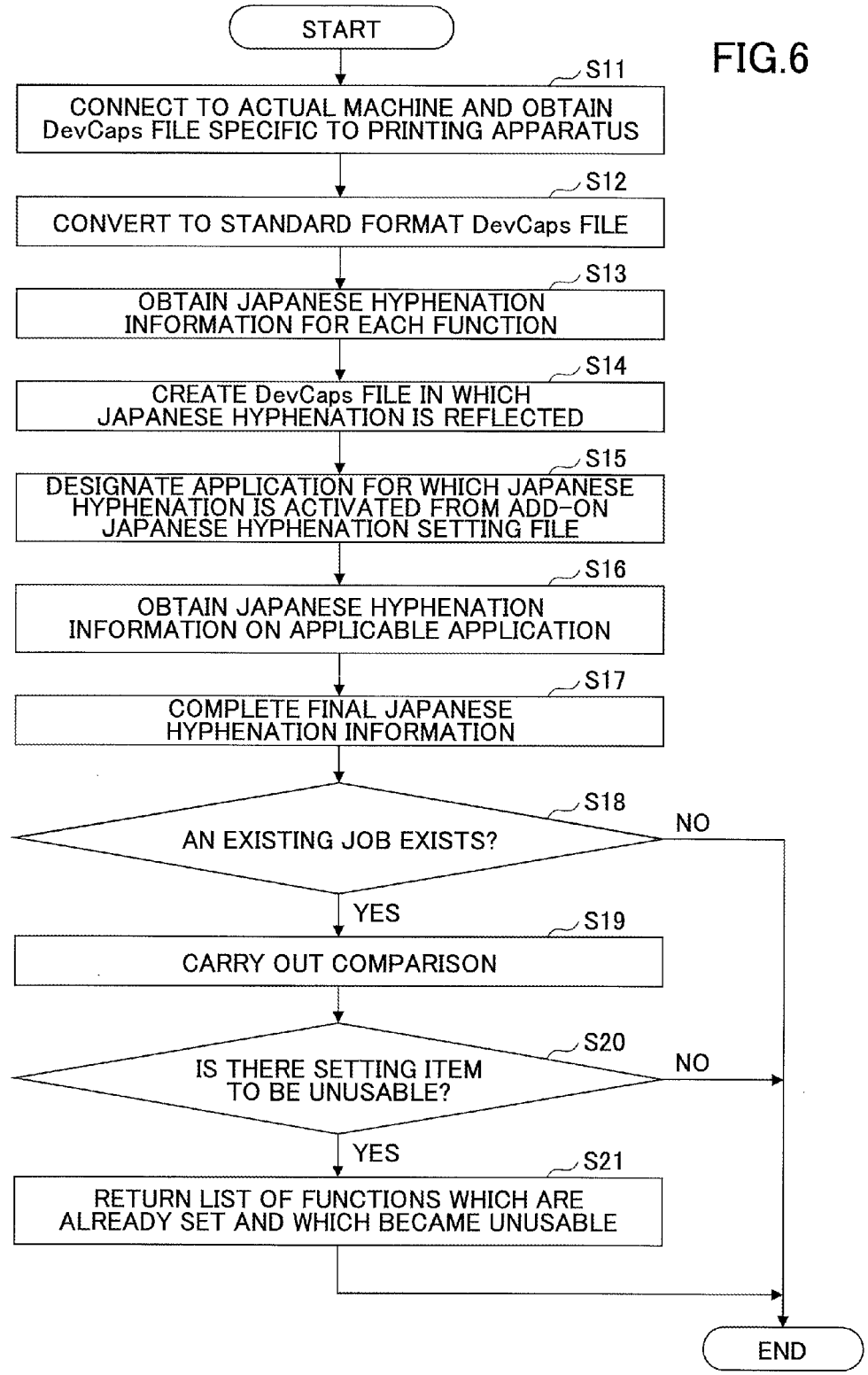

JAPANESE HYPHENATION PROCESSING PROGRAM, APPARATUS, METHOD, AND PRINTING SYSTEM

TECHNICAL FIELD

The present invention relates to Japanese hyphenation programs, apparatuses, methods, and printing systems.

BACKGROUND ART

There are related-art parameter processing apparatuses which perform Japanese hyphenation processing on a parameter setting by a user in a more rational manner (e.g., see Patent document 1).

Such a parameter processing apparatus includes an input unit for successively designating parameters; and a Japanese hyphenation processing unit which performs Japanese hyphenation processing when a combination of the designated parameters fails to apply to Japanese hyphenation, wherein a designating order of the parameters can be taken into account in the Japanese hyphenation processing.

RELATED ART DOCUMENT

Patent document 1: JP2000-225754A

DISCLOSURE OF THE INVENTION

A program which performs the Japanese hyphenation processing may need to respond to changes in printing apparatuses, such as when a printing apparatus is newly added. Moreover, the program which performs the Japanese hyphenation processing may need to respond to changes in application programs installed. However, it is not easy for the program which performs the Japanese hyphenation processing to respond to the changes in the printing apparatuses or the changes in the application programs installed.

In view of the above-described problems, an object of one embodiment of the present invention is to provide Japanese hyphenation processing programs, apparatuses, methods, and printing systems that may easily respond to changes in printing apparatuses and changes in application programs installed.

According to an embodiment of the present invention, a non-transitory computer-readable storage medium is provided, which non-transitory computer-readable storage medium has stored thereon Japanese hyphenation processing programs which, when executed by a computer, cause the computer to function as: a first Japanese hyphenation information obtaining unit which obtains functional hyphenation information based on information on equipment capabilities obtained from an equipment unit and functional Japanese hyphenation setting information using the equipment capabilities; a second Japanese hyphenation information obtaining unit which obtains logical Japanese hyphenation information to be used by an application program from logical hyphenation setting information to be defined and used by the respective programs; a determining unit which determines a setting item to be inactive from setting items set for a print job based on the functional Japanese hyphenation information and the logical Japanese hyphenation information; and a transmitting unit which transmits information on the determined setting item to be inactive to the application program.

One embodiment of the present application makes it possible to easily respond to changes in printing apparatuses and changes in application programs installed.

BRIEF DESCRIPTION OF THE DRAWINGS

Other objects, features, and advantages of the present invention will become more apparent from the following detailed descriptions when read in conjunction with the accompanying drawings, in which:

FIG. 6 is a flowchart of one example showing Japanese hyphenation processing.

BEST MODE FOR CARRYING OUT THE INVENTION

Next, embodiments for carrying out the present invention are explained with reference to the drawings based on the following embodiments. A printing system in the explanations below is for facilitating better understanding of the embodiments of the present invention, so that the embodiments are not limited to the following printing system.

Figure 1:
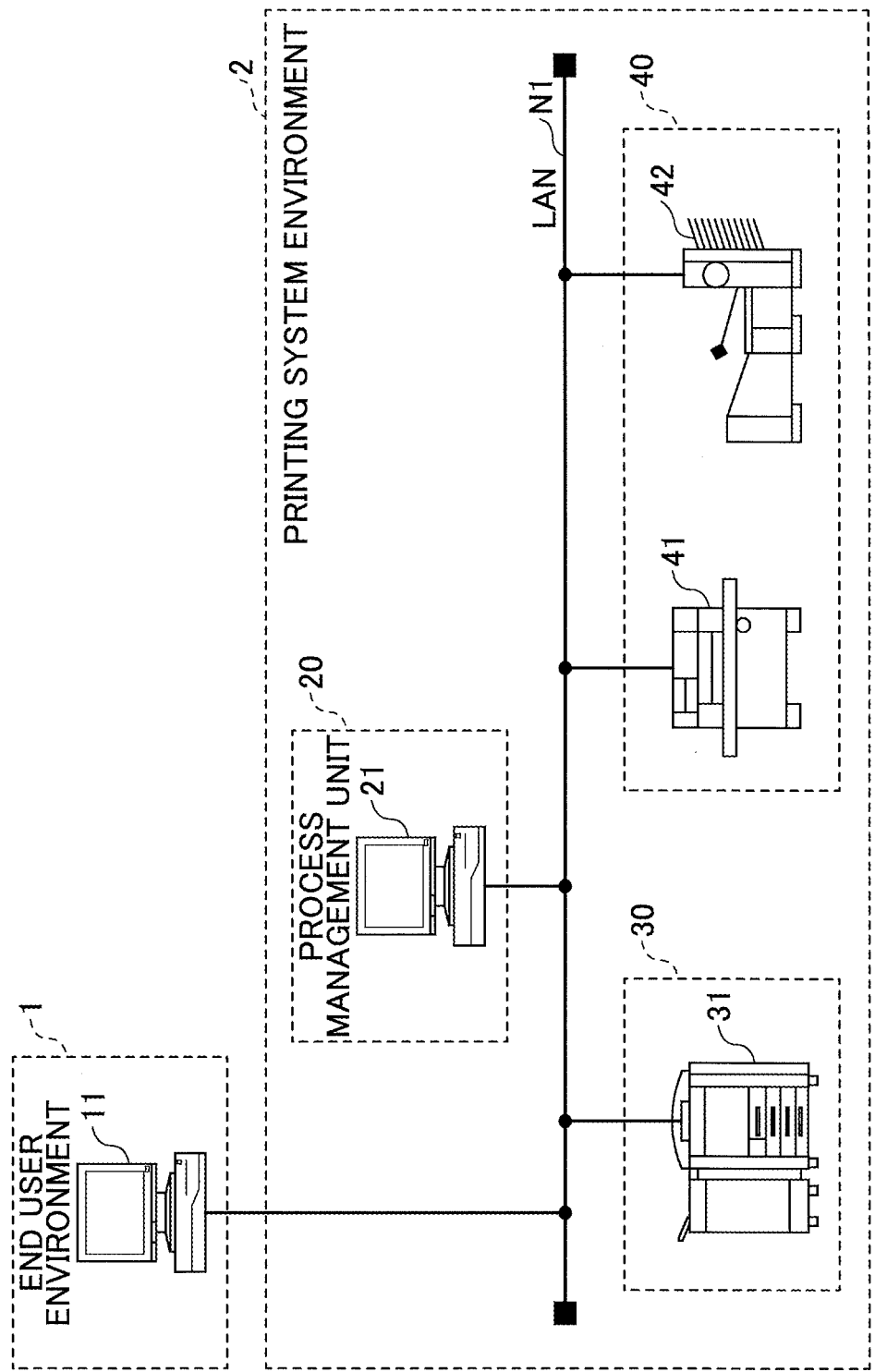
FIG. 1 is a block diagram illustrating one example of an overall configuration of a printing system according to the present embodiment.

FIG. 1 is a block diagram illustrating one example of an overall configuration of a printing system according to the present embodiment; the printing system according to the present embodiment includes an end user environment 1 and a printing system environment 2 that are connected via a network N1 such as a LAN.

The end user environment 1 is an environment which includes a client apparatus 11 which is connected to the network N1. The client apparatus 11, in which is installed a printing job editing application, may create/edit a print job.

The print job editing application may execute an image editing function for adding a header, a footer, a page number, etc.; and a Number Up imposition function for pasting multiple logical page images onto a sheet face, etc. Moreover, the print job editing application may designate, as post-processes, instructions for stapling and instructions for hole punching for printing and bookbinding.

The print system environment 2 includes a process management unit 20; a printing unit 30; and a post-press unit 40 that are connected online. In the printing system environment 2, the process management unit 20 instructs the respective processes of the printing unit 30 and the post-press unit 40 to execute tasks, integrally managing the workflow in the printing system environment 2.

The process management unit 20 receives a print job from the end user environment 1 and stores the print job. Moreover, the process management unit 20 constructs, as a workflow, tasks in the respective processes based on the print job from the end user; and efficiently schedules tasks of the respective operators, the printing unit 30, and the post-press unit 40. Furthermore, when an error occurs during automatic operation, the process management unit 20 may notify the operator thereof as needed. The process management unit 20 is generally configured to include at least one server apparatus 21.

The printing unit 30 performs printing through a printing apparatus 31 such as a monochrome MFP and a color MFP in accordance with instructions on the print job received from the process management unit 20. The printing unit 30 may print, through the printing apparatus 31, a document/image file; a file containing scanned images which were scanned by a scanning device; a document/image file in which these are edited, etc. In the present embodiment, instead of including the process management unit 20, a client apparatus 11 may be directly connected to the printing apparatus 31.

The configuration for installing the printing unit 30 may vary depending on the printing system environment 2. The printing unit 30 is configured to include a color or monochrome printing apparatus 31, etc. Functions performed by the printing apparatus 31 include not only simple printing, but also post-printing processes such as stapling, hole-punching, sheet cutting, case binding, ring binding, etc.

The post-press unit 40 executes post-processes in accordance with the print job received from the process management unit 20. The post-press unit 40 includes post-process devices such as a paper folding device, a case binding device, a sheet cutting device, a mail inserting device, a collating device, etc. The post-press unit 40 performs such post-processes as paper folding, saddle stitch bookbinding, case binding, mail inserting, collating, fine processes, etc., on a recording paper output from the printing unit 30.

The configuration for installing the post-process unit 40 may vary depending on the printing system environment 2. The post-press unit 40 includes post-processing devices for performing post-processes after printing, such as a stapler 41 and a hole-punch device 42.

An end user uses a print job editing application through the client apparatus 11 of the end user environment 1 to edit an image, perform imposition, insert text, and instruct performing a post-process, etc., and transmits a print job to the process management unit 20 of the printing system environment 2. The printing unit 30 and the post-press unit 40 are requested to perform printing and post-processing in accordance with the print job.

Hardware Configuration

Figure 2:
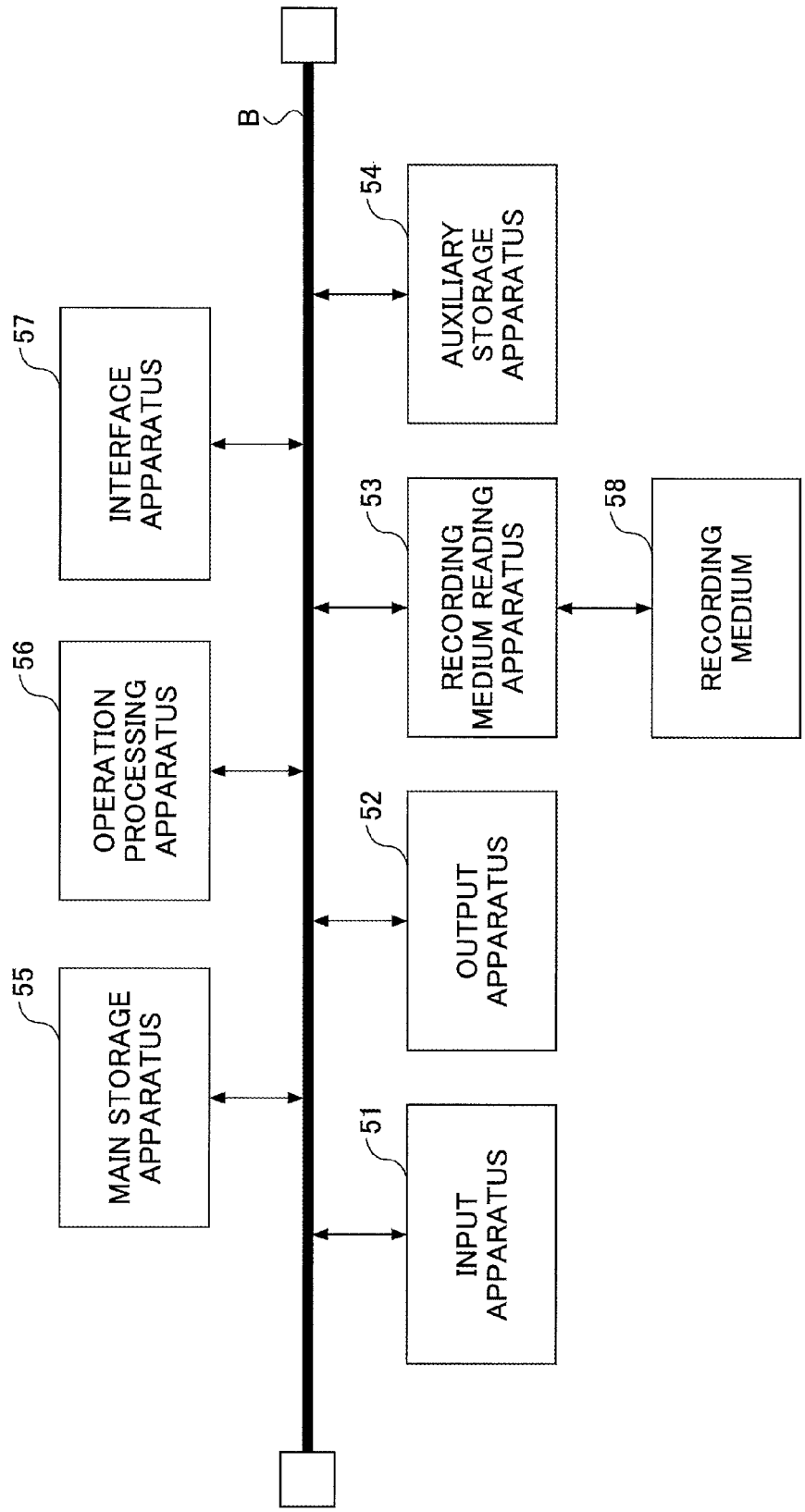
FIG. 2 is a hardware configuration diagram of one example of an information processing apparatus.

The client apparatus 11 is realized by an information processing apparatus having a hardware configuration as shown in FIG. 2, for example. FIG. 2 is a hardware configuration diagram of one example of the information processing apparatus. An information processing apparatus in FIG. 2 includes an input apparatus 51; an output apparatus 52; a recording medium reading apparatus 53, an auxiliary storage apparatus 54, a main storage apparatus 55, an operation processing apparatus 56, and an interface apparatus 57.

The input apparatus 51 is a keyboard, a mouse, etc. The input apparatus 51 is used for inputting various signals. The output apparatus 52 is a display apparatus, etc. The output apparatus 52 is used for displaying various windows, data, etc. The interface apparatus 57 is a modem, a LAN card, etc. The interface apparatus 57 is used for connecting to the network N1.

A print job editing application installed on the client apparatus 11 is a part of various programs which control the information processing apparatus 50. The print job editing application is provided through distribution of a recording medium 58, or downloading from the network N1, etc.

For the recording medium 58, various types of recording media may be used, including recording media which optically, electrically, or magnetically record information, such as a CD-ROM, a flexible disk, and a magneto-optical disk; and a semiconductor memory which electrically records information, such as a ROM, a flash memory, etc.

When the recording medium 58, on which the print job editing application is recorded, is set in the recoding medium reading apparatus 53, and the print job editing application is installed in the auxiliary storage apparatus 54 via the recording medium reading apparatus 53 from the recording medium 58. When the print job editing application is downloaded, it is installed in the auxiliary storage apparatus 54 via the interface apparatus 57. The auxiliary storage apparatus 54 stores the installed print job editing application.

The main storage apparatus 55 reads the print job editing application from the auxiliary storage apparatus 54 to store the read print job editing application. Then, in accordance with the print job editing application stored in the main storage apparatus 55, the operation processing apparatus 56 realizes various processes as described below in accordance with the print job editing application stored in the main storage apparatus 55.

Similarly, the server apparatus 21 of the process management unit 20 is realized by the information processing apparatus as shown in FIG. 2, for example. The operation processing apparatus 56 of the server apparatus realizes various processes of process management in accordance with programs related to process management that are stored in the main storage apparatus 55.

Software Configuration

Figure 3:
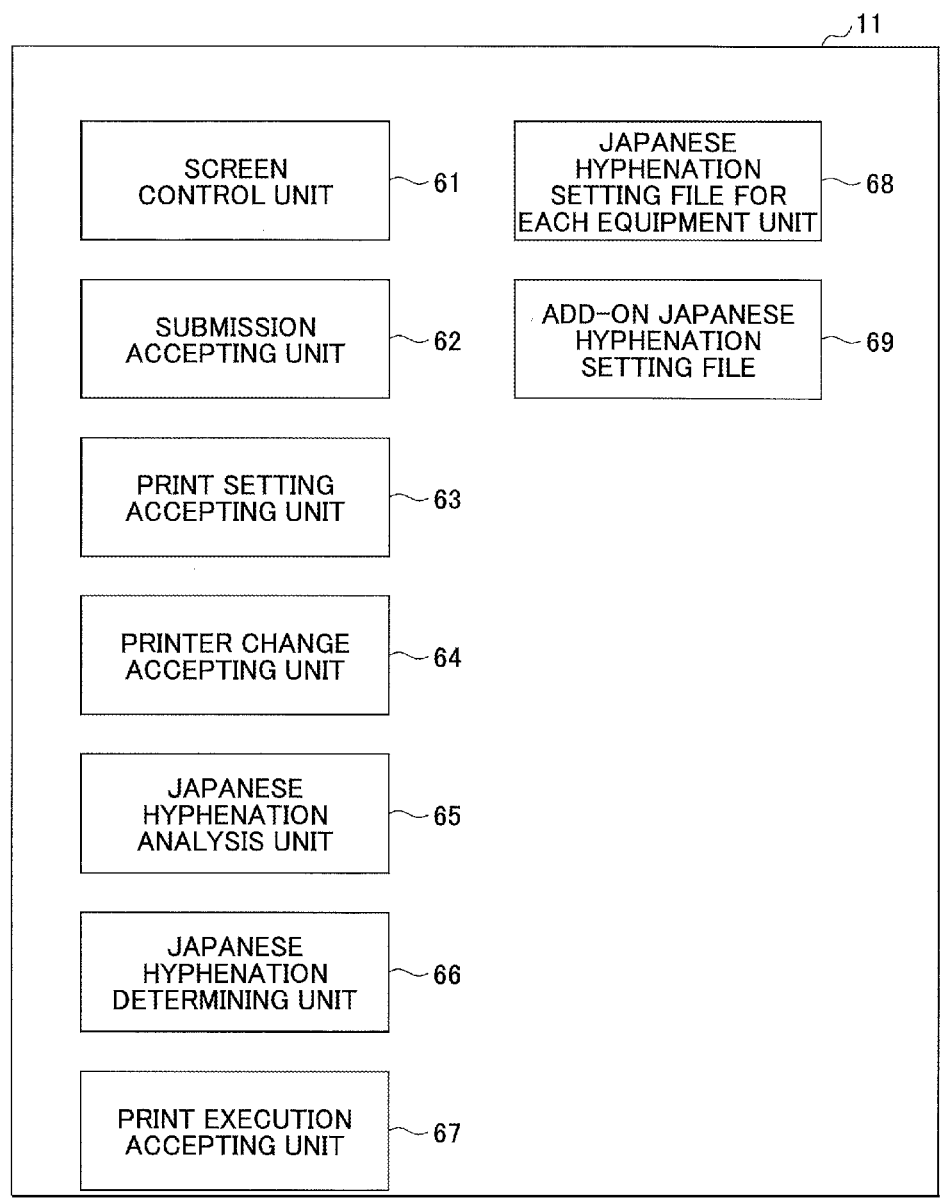
FIG. 3 is a processing block diagram of one example of a client apparatus.

The client apparatus 11 of the end user environment 1 is realized by processing blocks as shown in FIG. 3, for example. FIG. 3 is a processing block diagram of one example of a client apparatus; the client apparatus 11 has installed thereon the print job editing application. The client apparatus 11 executes the print job editing application to realize a screen control unit 61; a submission accepting unit 62; a print setting accepting unit 63; a printer change accepting unit 64; a Japanese hyphenation analysis unit 65, a Japanese hyphenation determining unit 66; a print execution accepting unit 67; a Japanese hyphenation setting file 68 for each equipment unit; and an add-on Japanese hyphenation setting file 69.

The screen control unit 61 performs a screen control of a UI. The submission accepting unit 62 accepts the submission of the print job from the user. The print setting accepting unit 63 accepts a print setting from the user via the UI. The printer change accepting unit 64 accepts a change in a designation of the printing apparatus 31 from the user via the UI.

The Japanese hyphenation analysis unit 65 generates Japanese hyphenation information as described below. In accordance with the change in the designation of the printing apparatus 31, the Japanese hyphenation determining unit 66 determines a setting item which is already set and unusable as an error function (a function to be inactive). As described below, the Japanese hyphenation determining unit 66 causes a list of functions which are already set and unusable to be displayed on the UI as a list of error functions. The user may refer to the list of error functions that is displayed on the UI to select, from the UI, releasing of the error function, cancellation of the change in the designation of the printing apparatus 31, etc. The print execution accepting unit 67 accepts an instruction for executing printing from the user via the UI.

The Japanese hyphenation setting file 68 for each equipment unit includes functional Japanese hyphenation settings which use capabilities of the equipment unit such as presence/absence of stapling, punching, etc. The add-on Japanese hyphenation setting file 69 includes logical Japanese hyphenation settings used by the respective applications uniquely defining, such as left open and right staple, etc. The add-on Japanese hyphenation setting file and the Japanese hyphenation setting file 68 for each equipment unit are external files.

The client apparatus 11 in FIG. 3 realizes Japanese hyphenation processing by the Japanese hyphenation analysis unit 65 and the Japanese hyphenation determining unit 66. The Japanese hyphenation processing in the client apparatus specify functional Japanese hyphenation settings based on the Japanese hyphenation setting file 68 for each equipment unit and the capabilities of the equipment unit (DevCaps).

Moreover, the Japanese hyphenation processing in the client apparatus 11 selects the logical Japanese hyphenation setting used by the print job editing application uniquely defining from the add-on Japanese hyphenation setting file 69. In the Japanese hyphenation processing in the client apparatus 11, the logical Japanese hyphenation setting used by the current print job editing application uniquely defining and the functional Japanese hyphenation setting are merged to cause the merged results to be displayed on the UI.

When the above-described Japanese hyphenation processing is performed using the programs related to the process management that are installed on the server apparatus 21 of the process management unit 20, the logical Japanese hyphenation setting used by the programs related to process management uniquely defining from the add-on Japanese hyphenation setting file 69 is selected to effect the setting.

Details of Processing

Below, a basic processing flow of the Japanese hyphenation processing realized in the printing system according to the present embodiment is described.

Overall Process

Figure 4:
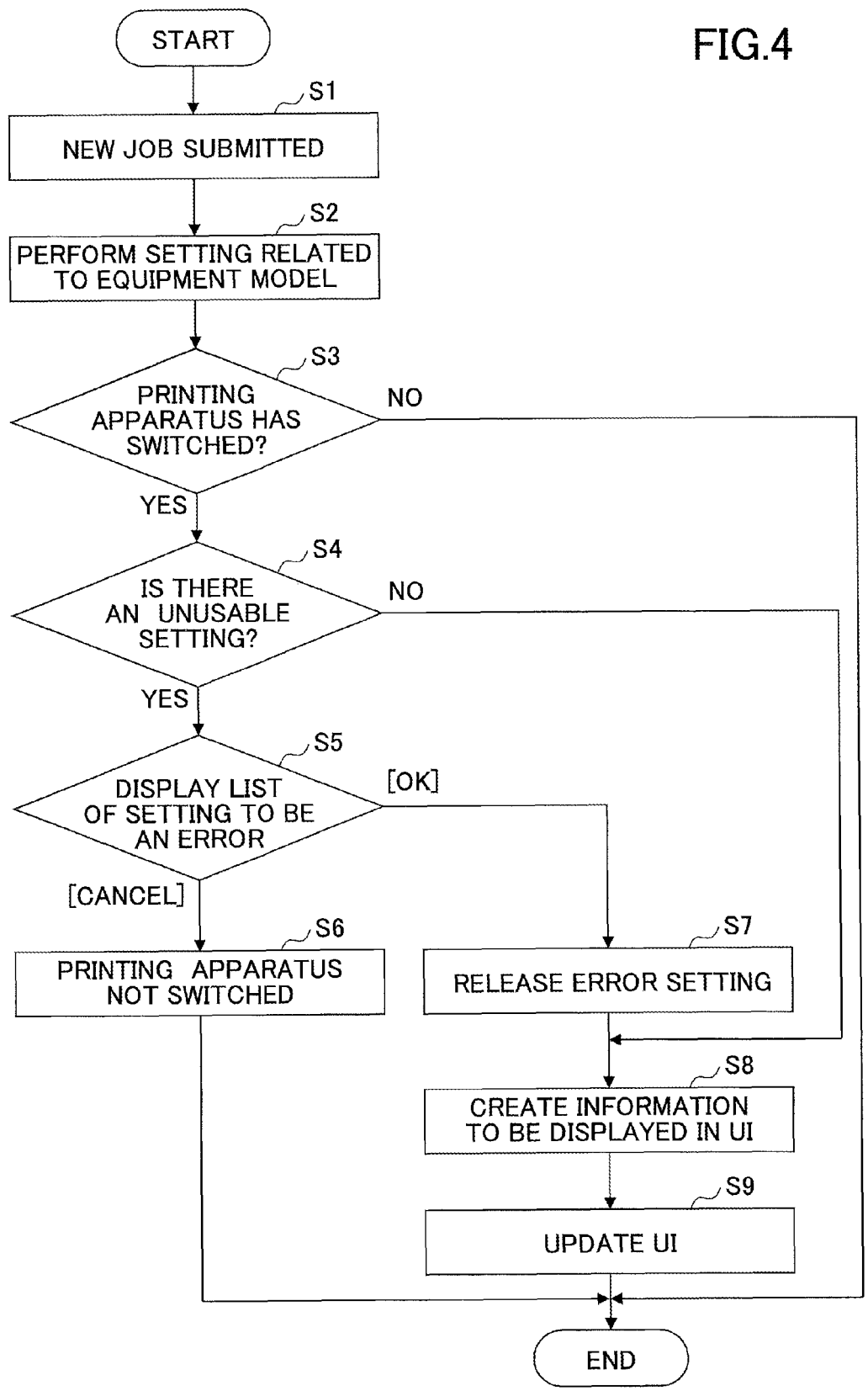
FIG. 4 is a flowchart of one example showing an overall process.

FIG. 4 is a flowchart of one example showing an overall process. In step S1, the user operates the client apparatus 11 and creates a new print job from the UI of the print job editing application. The screen control unit 61 displays, in the output apparatus 52, for example, the UI, which accepts the submission of the print job. The submission accepting unit 62 accepts the submission of the print job from the user.

In step S2, the user operates the client apparatus 11 and performs print setting on the print job from the UI. The screen control unit 61 displays, in the output apparatus 52, the UI, which accepts the print setting on the print job. The print setting accepting unit 63 accepts the print setting on the print job from the user via the UI. In step S2, the print setting is accepted within a range of default functions of the printing apparatus 31.

In step S3, the printer change accepting unit 64 determines whether the printer change accepting unit 64 accepted the change in the designation of the printing apparatus 31 from the user, or, in other words, whether the printing apparatus 31 has switched. The printer change accepting unit 64 accepts the change in the designation of the printing apparatus 31 from the user via the UI which accepts the change in the designation of the printing apparatus 31.

If the change in the designation of the printer apparatus is not accepted from the user, the process shown in FIG. 4 is completed. If the change in the designation of the printer apparatus 31 is accepted from the user, the Japanese hyphenation analysis unit 65 generates the Japanese hyphenation information as described below. Thereafter, in step S4, the Japanese hyphenation determining unit 66 uses the Japanese hyphenation information generated to determine whether there is an unusable setting due to the change in the designation of the printing apparatus 31 using the Japanese hyphenation information generated (to determine whether there is a function which becomes unusable).

If there is no setting made unusable by the change in the designation of the printing apparatus 31, the screen control unit 61, in step S8, generates information for collating the printer selection column to the change in the designation of the printing apparatus 31. Then, in step S9, the screen control unit 61 updates the UI to collate the printer selection column to the change in the designation of the printing apparatus 31.

Figure 5:
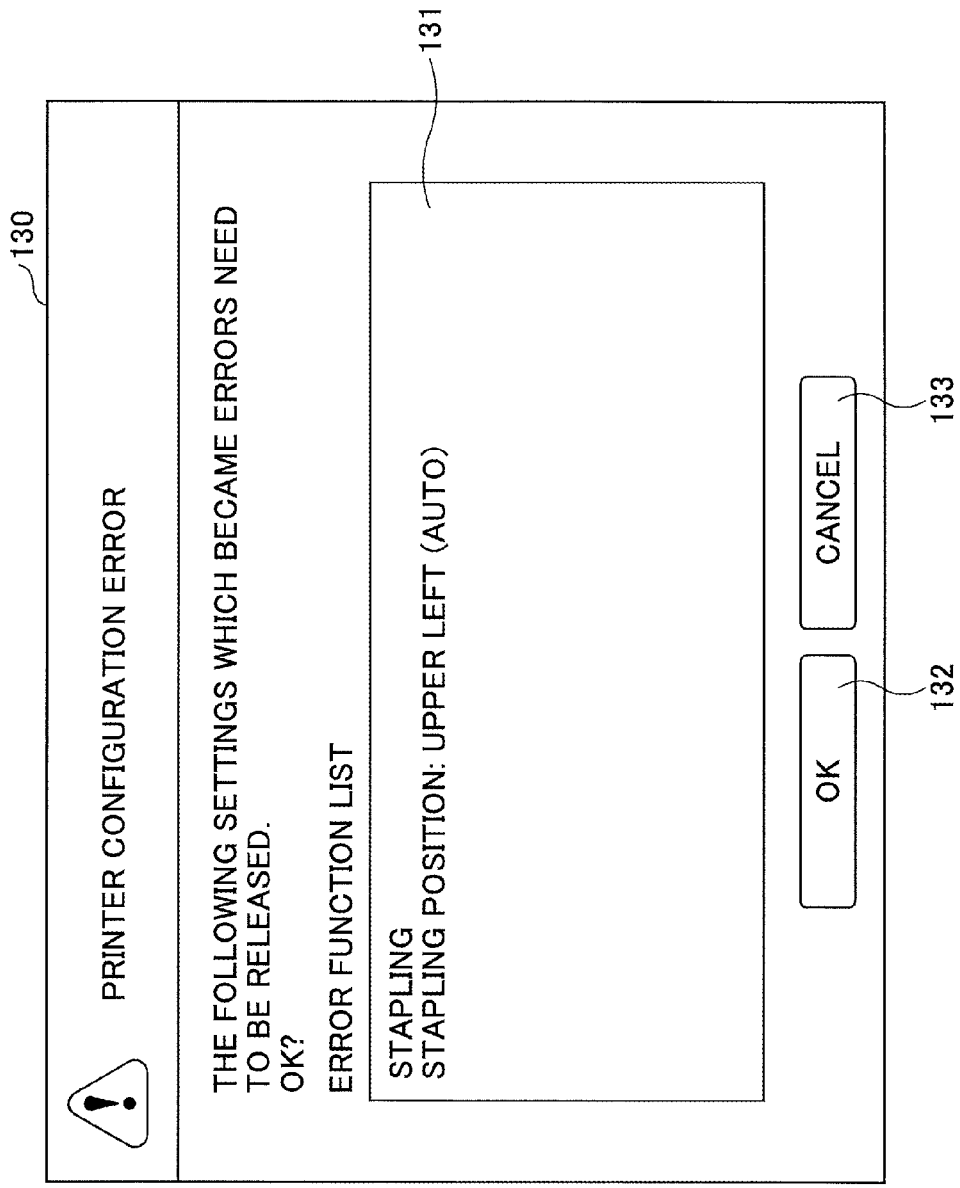
FIG. 5 is an image diagram showing one example of an error screen.

If there is a setting which is unusable due to the change in the designation of the printing apparatus 31, the screen control unit 61 displays an error screen 130 as shown in FIG. 5. The Japanese hyphenation determining unit determines, as an error function, a function which becomes unusable due to the change in the designation of the printing apparatus 31 and causes an error function list 131 to be displayed on the UI.

When a [Cancel] button 133 for changing the designation of the printing apparatus 31 is selected from the error screen 130 as shown in FIG. 5, the screen control unit 61 displays the UI in which the printer selection column is left as the original printing apparatus 31.

When an [OK] button which shows releasing of the print setting of the error function is pressed down from the error screen 130 as shown in FIG. 5, the screen control unit 61 releases the print setting of the error function in step S7. In step S8, the screen control unit 61 causes displaying of the printing apparatus 31 shown in the printer selection column to be changed. Then, in step S9, the screen control unit 61 updates the UI to collate the printer selection column to the change in the designation of the printing apparatus 31.

Japanese Hyphenation Processing

Detailed processes in step S4 are described. After receiving the change in the designation of the printer apparatus 31 from the user, the Japanese hyphenation analysis unit 65 starts the process in a flowchart as shown in FIG. 6. FIG. 6 is a flowchart of one example showing the Japanese hyphenation process. In step S11, the Japanese hyphenation analysis unit 65 is connected to the printing apparatus 31, which is an actual machine, and obtains a DevCaps file of the printing apparatus 31. The DevCaps file obtained here includes information on presence/absence of most recent functions included in the printing apparatus 31 (information on presence/absence of double-side print, stapling, hole-punch functions, etc.).

In step S12, the Japanese hyphenation analysis unit 65 converts the format of the DevCaps file obtained from the printing apparatus 31 to a standard format, unifying the format. In step S13, the Japanese hyphenation analysis unit obtains the Japanese hyphenation setting file 68 for each equipment unit. In step S14, based on the DevCaps file of the printing apparatus 31 and the Japanese hyphenation setting file 68 for each equipment unit, the Japanese hyphenation analysis unit 65 creates a Devcaps file in which the Japanese hyphenation is reflected. The Japanese hyphenation-reflected DevCaps file includes functional Japanese hyphenation information for the printing apparatus 31.

In step S15, the Japanese hyphenation analysis unit 65 selects logical Japanese hyphenation information for use by the current print job editing application from the add-on Japanese hyphenation setting file 69. In step S16, the Japanese hyphenation analysis unit 65 obtains information on combinations of Japanese hyphenations not available for use on the print job editing application (logical information on Japanese hyphenation). The logical information on Japanese hyphenation that is obtained here is Japanese hyphenation information common in the printing apparatus 31.

In step S17, the Japanese hyphenation analysis unit 65 merges the functional Japanese hyphenation information created in step S14 and the logical Japanese hyphenation information obtained in step S16 to complete final Japanese hyphenation information.

In step S18, the Japanese hyphenation determining unit determines whether a print job exists. If no existing print job exists, the Japanese hyphenation determining unit 66 completes the process in the flowchart shown in FIG. 6.

If existing print job exists, the Japanese hyphenation determining unit 66 compares the print setting for the existing print job and the final Japanese hyphenation information completed in step S17 to check the matching condition. In step S20, the Japanese hyphenation determining unit 66 determines whether there is a setting item to be unusable due to a change in the designation of the printing apparatus 31 (whether there is a function to become unusable). If there is no setting item which becomes unusable due to the change in the designation of the printing apparatus 31, the Japanese hyphenation determining unit 66 completes the process in the flowchart shown in FIG. 6.

If there is a setting item which becomes unusable due to the change in the designation of the printing apparatus 31, the Japanese hyphenation determining unit 66, in step S21, returns, to the screen control unit 61, a list of functions which become unusable due to the change in the designation of the printing apparatus 31. The screen control unit 61 displays the error function list on the UI.

Change in Functional Japanese Hyphenation Information

For cases in which functional Japanese hyphenation information is changed, addition of a new equipment unit, change in the specification of an existing equipment unit, etc., are envisaged. In the Japanese hyphenation process according to the present embodiment, the following tasks are performed in responding to changes in the functional Japanese hyphenation information.

For a format in which the DevCaps file which may be obtained from an equipment unit to be added or for which specification is changed is not envisaged, a process of converting to the DevCaps file of the standard format is implemented. Moreover, the Japanese hyphenation setting rule for the subject equipment unit is added to the Japanese hyphenation setting file 68 for each equipment unit.

In this way, in the Japanese hyphenation process of the present embodiment, changing of the functional Japanese hyphenation information is provided for based on a process of converting to the DevCaps file of the standard format and addition of the Japanese hyphenation setting file for the subject equipment unit to the Japanese hyphenation setting file 68 for each equipment unit.

In other words, no change in implementation is needed for the Japanese hyphenation analysis unit 65 for addition of a new equipment unit or a specification change of existing equipment. The Japanese hyphenation analysis unit may be used without depending on the type or the configuration of the equipment unit. When the Japanese hyphenation process of the present embodiment is not used, it is necessary to change the implementation of the Japanese hyphenation analysis unit 65 to perform the analysis process or the conversion process while being aware of the subject equipment unit, so that the complexity increases.

Change in Logical Japanese Hyphenation Information

As a case of changing a logical Japanese hyphenation condition, porting of the Japanese hyphenation process to a different application is envisaged. In the Japanese hyphenation process according to the present embodiment, the following tasks are performed in providing for changes in the logical Japanese hyphenation information.

For porting to an existing application, a Japanese hyphenation setting file for an application to which the add-on Japanese hyphenation setting file 69 is ported is activated. For porting to a new application, a Japanese hyphenation setting file for the application to be ported to the add-on Japanese hyphenation setting file 69 is added, which added Japanese hyphenation setting file is activated.

In this way, in the Japanese hyphenation process in the present embodiment, the Japanese hyphenation setting file for the application to which the add-on Japanese hyphenation setting file 69 is ported is activated to provide for the change in the logical Japanese hyphenation information.

In other words, the Japanese hyphenation analysis unit 65 does not require a change in implementation for a change in an application such as porting to a different application. The Japanese hyphenation analysis unit 65 may be used without depending on the application. When the Japanese hyphenation process of the present embodiment is not used, it is necessary to change the implementation of the Japanese hyphenation analysis unit 65 to perform the analysis process while being aware of the application-specific specifications, so that the portability is low.

SUMMARY

In a pre-press process for a production printing (PP) business, it is possible not only to designate the printing apparatus 31 for outputting and then perform print setting (job ticket generation), but also to change the printing apparatus 31 after the job ticket generation. The job ticket is prevented from using an unusable function (an inactive function) in accordance with capabilities included in the respective printing apparatuses 31. For example, the function which could be used (the valid function) at the time of generating the job ticket could become unusable by changing the designation of the printing apparatus 31.

Changing the designation of the printing apparatus 31 requires the application which determines the function to be not available for use to change the implementation when the new printing apparatus 31 is added, causing efforts to be required in updating the determination pattern. Moreover, a case of porting a similar determination pattern to a new application also requires changing the implementation, causing efforts therein.

More specifically, the change in the designation of the printing apparatus 31 allows the application which determines the function to become unusable to derive a function to inactivate based on the functional Japanese hyphenation condition in accordance with the capabilities of the printing apparatus 31 and the logical Japanese hyphenation condition of the print setting that is included in the application.

However, the capabilities of the printing apparatus 31 vary depending on the model or the physical configuration of the printing apparatus 31, so that there are functional Japanese hyphenation combination patterns numbering the number of combinations of the types of corresponding models and possible physical configurations for these models. Therefore, managing Japanese hyphenation settings according to these patterns become complex.

Moreover, device capability information (DevCaps file) which shows the capability of the printing apparatus 31 may vary in definition or format depending on the equipment unit, so that the implementation of the Japanese hyphenation analysis unit 65 needs to be modified whenever responding to a new equipment unit. For the logical Japanese hyphenation condition included in the application as well, whenever there is a change in the application which forms the Japanese hyphenation process, the Japanese hyphenation condition which responds to the print setting needs to be created and designated to be read by the Japanese hyphenation analysis unit 65, which lacks in portability.

The present embodiment makes it possible to respond to changes in both the functional Japanese hyphenation and the logical Japanese hyphenation without modifying the implementation of the Japanese hyphenation analysis unit 65.

The present embodiment includes a DevCaps file which holds all of the physical configurations and functions that may be included in the equipment units supported and the Japanese hyphenation setting file 68 for each equipment unit that crosses out functions which cannot be used in accordance with the actual physical configuration. Therefore, the present embodiment makes it possible to manage functional Japanese hyphenation in the Japanese hyphenation setting file 68 for each equipment unit without changing the implementation of the Japanese hyphenation analysis unit 65 and to provide for functional Japanese hyphenation for a new equipment unit.

When providing for an equipment unit having a DevCaps file with a format which is different from that for a DevCaps file used as the standard, the difference in the format is absorbed by providing a layer for converting to the DevCaps file with the standard format. Therefore, the present embodiment makes it possible to provide for functional Japanese hyphenation in a new equipment unit without changing the implementation of the Japanese hyphenation analysis unit 65.

Moreover, in the present embodiment, the logical Japanese hyphenation is managed on an add-on basis, and keywords and combinations for the Japanese hyphenation are defined as a mapping file for each application. Selection of the mapping file in accordance with the application used may be separately controlled with the add-on Japanese hyphenation setting file 69 to provide for porting to a different application without changing the implementation of the Japanese hyphenation analysis unit 65.

As described above, the present embodiment makes it possible to standardize the DevCap files with different formats for each equipment unit and leave managing of functional and logical Japanese hyphenations to an external file to change the Japanese hyphenation conditions without changing the implementation of the Japanese hyphenation analysis unit 65.

The present invention is not limited to embodiments which are specifically disclosed, so that variations and modifications may be made thereto without departing from the scope of the claims.

The present application is based on and claims the benefit of priority of Japanese Priority Application No. 2013-050890 filed on Mar. 13, 2013, the entire contents of which are hereby incorporated by reference.

The invention claimed is:

1. A non-transitory computer-readable storage medium which has stored thereon Japanese hyphenation processing programs which, when executed by a computer, cause the computer to function as:
    a first Japanese hyphenation information obtaining unit which obtains functional Japanese hyphenation information based on information on equipment capabilities obtained from an equipment unit and functional Japanese hyphenation setting information using the equipment capabilities;
    a second Japanese hyphenation information obtaining unit which obtains logical Japanese hyphenation information to be used by an application program from logical hyphenation setting information to be defined and used by the respective programs;
    a determining unit which determines a setting item to be inactive from setting items set for a print job based on the functional Japanese hyphenation information and the logical Japanese hyphenation information; and
    a transmitting unit which transmits information on the determined setting item to be inactive to the application program.

2. The non-transitory computer-readable storage medium as claimed in claim 1, wherein
    the first Japanese hyphenation information obtaining unit includes an equipment information obtaining unit which obtains the information on the equipment capabilities from the equipment unit;
    a Japanese hyphenation setting information obtaining unit which obtains the functional Japanese hyphenation setting information using the equipment capabilities from a file which holds the functional Japanese hyphenation setting information using the equipment capabilities; and
    a Japanese hyphenation information generating unit which generates the functional Japanese hyphenation information based on the information on the equipment capabilities and the functional Japanese hyphenation setting information.

3. The non-transitory computer-readable storage medium as claimed in claim 2, further comprising
    a format converting unit which converts a format of the information on the equipment capabilities that is obtained from the equipment unit to a standard format and unify the format of the information on the equipment capabilities.

4. The non-transitory computer-readable storage medium as claimed in claim 1, wherein
    the second Japanese hyphenation information obtaining unit obtains the logical Japanese hyphenation information to be used by the application program from the file holding the logical hyphenation setting information to be defined and used by the respective programs.

5. The non-transitory computer-readable storage medium as claimed in claim 1, wherein
    the Japanese hyphenation processing programs are installed in the application program.

6. A Japanese hyphenation processing apparatus, comprising:
    a first Japanese hyphenation information obtaining unit which obtains functional Japanese hyphenation information based on information on equipment capabilities obtained from an equipment unit and functional Japanese hyphenation setting information using the equipment capabilities;
    a second Japanese hyphenation information obtaining unit which obtains logical Japanese hyphenation information to be used by an application program from logical hyphenation setting information to be defined and used by respective Japanese hyphenation processing programs;
    a determining unit which determines a setting item to be inactive from setting items set for a print job based on the functional Japanese hyphenation information and the logical Japanese hyphenation information; and
    a transmitting unit which transmits information on the determined setting item to be inactive to the application program.

7. A Japanese hyphenation processing method which is executed by a computer, the method comprising:
    obtaining, by the computer, functional Japanese hyphenation information based on information on equipment capabilities obtained from an equipment unit and functional Japanese hyphenation setting information using the equipment capabilities;
    obtaining, by the computer, logical Japanese hyphenation information to be used by an application program from logical hyphenation setting information to be defined and used by respective Japanese hyphenation processing programs;

determining, by the computer, a setting item to be inactive from setting items set for a print job based on the functional Japanese hyphenation information and the logical Japanese hyphenation information; and transmitting, by the computer, information on the determined setting item to be inactive to the application program.

8. A printing system including an application program to be installed in a computer and a printing unit, the application program including

- a first Japanese hyphenation information obtaining unit which obtains functional Japanese hyphenation information based on information on equipment capabilities obtained from an equipment unit and functional Japanese hyphenation setting information using the equipment capabilities;
- a second Japanese hyphenation information obtaining unit which obtains logical Japanese hyphenation information to be used by the application program from logical hyphenation setting information to be defined and used by respective Japanese hyphenation processing programs;
- a determining unit which determines a setting item to be inactive from setting items set for a print job based on the functional Japanese hyphenation information and the logical Japanese hyphenation information; and
- a display unit which displays information on the determined setting item to be inactive.

\* \* \* \* \*